US011858358B2

(12) United States Patent
Grothe (10) Patent No.: US 11,858,358 B2
(45) Date of Patent: Jan. 2, 2024

(54) DEVICE FOR FASTENING A SLIDING ELEMENT TO A CURRENT COLLECTOR

(71) Applicant: PANTRAC GMBH, Berlin (DE)

(72) Inventor: Bastian Grothe, Berlin (DE)

(73) Assignee: PANTRAC GMBH, Berlin (DE)

( * ) Notice: Subject to any disclaimer, the term of this patent is extended or adjusted under 35 U.S.C. 154(b) by 601 days.

(21) Appl. No.: 17/046,474

(22) PCT Filed: Apr. 23, 2019

(86) PCT No.: PCT/EP2019/060289
§ 371 (c)(1),
(2) Date: Oct. 9, 2020

(87) PCT Pub. No.: WO2019/214931
PCT Pub. Date: Nov. 14, 2019

(65) Prior Publication Data
US 2021/0170876 A1   Jun. 10, 2021

(30) Foreign Application Priority Data

Jul. 5, 2018  (DE) .......................... 102018110902.4

(51) Int. Cl.
*B60L 5/22* (2006.01)
*B60L 5/20* (2006.01)
(Continued)

(52) U.S. Cl.
CPC ................ *B60L 5/22* (2013.01); *B60L 5/18* (2013.01); *B60L 5/205* (2013.01); *B60L 5/24* (2013.01); *B60L 2200/26* (2013.01)

(58) Field of Classification Search
CPC .... B60L 5/22; B60L 5/205; B60L 5/18; B60L 5/24; B60L 5/28; B60L 5/32; B60L 2200/26
(Continued)

(56) References Cited

U.S. PATENT DOCUMENTS 476,367 A * 6/1892 Crane ....................... B60L 5/16
  191/68
531,383 A * 12/1894 Newhouse ............... B60L 5/06
  191/60.1
(Continued)

FOREIGN PATENT DOCUMENTS

CN  104149632 A * 11/2014 ................ B60L 5/18
DE  102004020886 A1 * 11/2005 ............. B60L 5/205
(Continued)

OTHER PUBLICATIONS

International Search Report for PCT/EP2019/060289, dated Jul. 17, 2019, 2 pages.

*Primary Examiner* — Zachary L Kuhfuss
*Assistant Examiner* — James William Jones
(74) *Attorney, Agent, or Firm* — The Small Patent Law Group LLC; Christopher R. Carroll (57) ABSTRACT

The invention relates to a device for fastening a sliding element to a current collector or to a rocker mounted thereto, to draw electrical energy from an overhead contact line to an electrically driven vehicle. The device comprises a sliding element, a carrier, a carbon contact piece arranged on the carrier, and a fastening point for fastening the sliding element to the current collector is formed between the sliding element and the current collector. At each fastening point between the sliding element and the current collector, a detent assembly is arranged on the side of the sliding element and, for each detent assembly, a receptacle for the detent assembly is arranged on the side of the current collector. Each detent assembly and the receptacle associated therewith are releasably brought into engagement with each other by inserting and locking the detent assembly in the receptacle.

16 Claims, 6 Drawing Sheets

(51) Int. Cl.
  *B60L 5/18* (2006.01)
  *B60L 5/24* (2006.01)
(58) Field of Classification Search
  USPC .................................................. 191/5, 50
  See application file for complete search history.

(56) References Cited

U.S. PATENT DOCUMENTS

| | | | | |
|---|---|---|---|---|
| 1,048,164 | A * | 12/1912 | Hornbostel | ............... B60L 5/14 |
| | | | | 191/95 |
| 2007/0272506 | A1* | 11/2007 | Herrmann | ............... B60L 5/205 |
| | | | | 191/55 |
| 2014/0311850 | A1* | 10/2014 | Fardel | .................... B60L 5/205 |
| | | | | 29/874 |

FOREIGN PATENT DOCUMENTS

| | | | | |
|---|---|---|---|---|
| DE | 102009047757 A1 * | 6/2011 | ............. | B60L 5/205 |
| DE | 102018110902 A1 * | 11/2019 | ............. | B60L 5/205 |
| EP | 0384972 A2 | 9/1990 | | |
| EP | 0462909 A1 | 12/1991 | | |
| EP | 872374 A1 * | 10/1998 | ............. | B60L 5/205 |
| EP | 0947375 A1 | 10/1999 | | |
| EP | 2311684 A1 * | 4/2011 | ................ | B60L 5/19 |
| EP | 3315348 A1 * | 5/2018 | ................ | B60L 5/22 |
| JP | S63-117603 A | 5/1988 | | |
| JP | H06-080304 U | 11/1994 | | |
| JP | H07-064497 A | 3/1995 | | |
| JP | 2014530591 A | 11/2014 | | |
| RU | 2526732 C2 | 8/2014 | | |
| RU | 2648485 C2 | 3/2018 | | |
| WO | WO-2015067235 A2 * | 5/2015 | ................ | B60L 5/20 |

\* cited by examiner

DEVICE FOR FASTENING A SLIDING ELEMENT TO A CURRENT COLLECTOR

The invention relates to a device for fastening a sliding element to a current collector in order to draw electrical energy from an overhead contact line to an electrically driven vehicle, and also to a current collector and an electrically driven vehicle.

Sliding elements of the generic type are known. They are integral parts of a current collector which is connected to an electrically driven vehicle. The sliding element is in contact with a stationary overhead contact line and serves to draw electrical energy from the overhead contact line to the electrically driven vehicle.

The sliding elements comprise a carrier and at least one carbon contact piece arranged on the carrier. The carrier and the at least one carbon contact piece are connected in the known way by bonding. Here, an electrically conductive adhesive is deployed. The aim is to achieve as low as possible a transition resistance between the carbon contact pieces and the carrier. The connection can also be effected by other suitable measures, for example clamping, riveting, screwing, soldering or the like.

The carrier can also have an air duct which is connected to a compressed air connection. Said compressed air duct extends substantially over the entire length of the carrier. Said compressed air duct serves to recognise damage or wear to the carbon contact pieces. If the damage or wear is too severe, the duct pressurized by compressed air is exposed so that a drop in pressure takes place, which is detected by a corresponding control unit. The current collector is then lowered, i.e. separated from the overhead contact line.

Known sliding elements are fixed by means of screw connections to the upper end of the current collector or to a rocker mounted there. Further connections such as, for example, for compressed air or electrical contactings are mounted separately.

When changing the sliding elements, multiple screw connections for the mechanical retention, further screw connections for the electrical connection and, if applicable, multiple pneumatic connections for the compressed air transfer must, as a general rule, be released and, after the sliding element has been changed, these have to be refixed to the replacement element. As a result, this process is very time-consuming. In addition, the fact that the sliding elements are usually changed on the roof of the vehicle leads to more difficult conditions. This results in an increased risk of incorrect installations. All in all, the process of changing sliding elements with the known fastening system in the form of screw connections can be extremely costly, due to the time-consuming nature and susceptibility to errors thereof.

It is therefore an object of the invention to propose a system for fastening carbon contact strips to a current collector or to a rocker mounted there of an electrically operated vehicle, with which the maintenance process can be simplified, accelerated and performed more cheaply.

According to the invention, this object is achieved by a device having the features indicated in claim 1. Advantageous configurations and further developments are described in the dependent claims.

In the case of a device according to the invention for fastening a sliding element to a current collector or to a rocker mounted there, in order to draw electrical energy from an overhead contact line to an electrically driven vehicle, the overhead contact line is arranged in a stationary manner and the current collector is connected to the vehicle. It is always assumed below that the sliding element is fastened to a current collector or to a rocker mounted there, even if only the current collector is indicated. The sliding element comprises a carrier and at least one carbon contact piece arranged on the carrier. At least one fastening point for fastening the sliding element to the current collector is formed between the sliding element and the current collector. Thanks to the formation of at least two fastening points preferably between the sliding element and the current collector, a secure fastening of the sliding element to the current collector and also, simultaneously, the secure location or respectively alignment of the sliding element with respect to the current collector is guaranteed.

At each fastening point between the sliding element and the current collector, at least one detent means is arranged on the side of the sliding element and, for each of the detent means, a receptacle for said detent means which is associated therewith is arranged on the side of the current collector. Each detent means and the receptacle associated therewith in each case are releasably brought into engagement with each other by inserting and locking the detent means in the receptacle associated therewith. In other words, a number of detent means are formed on the sliding element at each fastening point, and a corresponding number of receptacles associated with the detent means are formed on the current collector, which are arranged in terms of location so that the detent means for fastening the sliding element are introduced into the receptacles on the current collector, where they lock in the receptacle. The device can therefore also be referred to as a "click system", in which the detent means are "clicked into" the respective receptacle.

In a first embodiment, the carrier of the sliding element can have a compressed air duct for monitoring the compressed air or respectively a damage or wear indication of the at least one carbon contact piece. The compressed air duct is supplied with compressed air and the latter is detected by a control unit. If the at least one carbon contact piece is damaged or worn too much, a drop in pressure occurs, which is detected by the control unit. The current collector is subsequently lowered and thus separated from the overhead contact line.

In a fastening system according to the invention, both the detent means and the receptacle associated therewith can each have corresponding through holes which form a continuous through hole for a compressed air transfer from the current collector into the compressed air duct in the carrier, if the detent means and the receptacle associated therewith are releasably brought into engagement with each other. The respective through holes in the detent means and the associated receptacle form a portion of a compressed air through hole from the current collector to the compressed air duct in the carrier of the sliding element. If the detent means and receptacle are brought into engagement, the through hole of the detent means forms the continuation of the through hole of the receptacle right into the compressed air duct of the carrier. As a result of the engaging in one another of the respective through holes in the detent means and the associated receptacle during inserting and locking of the detent means in the associated receptacle, the pneumatic connection for the compressed air transfer is consequently created, which then no longer has to be connected separately. Changing a sliding element is thus considerably accelerated and simplified. The electrical connection of the sliding elements is not affected by this. This is preferably effected with at least one screw connection.

In a next embodiment, the detent means can have outwardly directed projections which, on insertion of the detent means into the receptacle associated therewith, lock behind corresponding projections in the receptacle and/or in corresponding cavities in the receptacle. Accordingly, projections are formed in the interior of the receptacle, into which the detent means is inserted, which projections project into the region in which the detent means is inserted. Alternatively or simultaneously, cavities can be formed in the interior of the receptacle, which correspond to the projections on the detent means. If the detent means are now inserted into the receptacle with a corresponding application of force, the projections of the detent means are pushed behind the projections in the interior of the receptacle and/or are brought into the region of the cavities in the interior of the receptacle so that the projections of the detent means are fixed and the detent means are locked in said position. The person skilled in the art will easily recognise that the formation of projections and cavities can also be effected in the reverse manner so that the projections can be formed in the interior of the receptacle and the corresponding projections and/or cavities can be formed on the detent means.

Sealing elements which prevent a leakage of the compressed air can preferably be associated with the detent means and/or the receptacle.

The outwardly directed projections of the detent means and the corresponding projections and/or cavities of the receptacle can be formed along the entire circumference of the detent means and/or the interior of the receptacle or can be interrupted in sections. Interruptions can be provided, for example, in order to reduce the material and/or manufacturing outlay in order to form the projections and/or cavities, but also in order to simplify the penetration of the detent means in, and releasing of the detent means from, the receptacle. If, for example, projections of the detent means and projections of the receptacle are only formed in sections, the detent means and the receptacle can be rotated relative to one another for releasing, so that the respective projections are arranged offset with respect to one another in such a manner that the detent means can be released from the receptacle without exerting a great deal of force.

In a further embodiment, the projections of the detent means can be formed as movably supported elements and can be connected to a biasing mechanism so that, on insertion of the detent means into the associated receptacle, the movably supported elements are pressed into the interior of the detent means and, after passing through the projections and/or on reaching the cavities, are pressed out of the interior of the detent means by the biasing mechanism. Thanks to the movable formation of the projections and the resetting in the initial position by the biasing mechanism, the process of inserting the detent means into the associated receptacle and releasing the detent means from the receptacle is facilitated. It can be recognized by the person skilled in the art that even during releasing of the detent means, the movably supported elements are pressed into the interior of the detent means and are pressed out again by the biasing mechanism after passing through the projections in the interior of the receptacle. Similarly, it is obvious for the person skilled in the art that, with the same mode of operation, movably supported elements can alternatively be arranged in the interior of the receptacle, while corresponding projections and/or cavities can be provided on the detent means.

Furthermore, the biasing mechanism can have an operating element for manual actuation in order to move the movably supported elements into the interior of the detent means. Said operating element should be arranged such that it can be conveniently reached and operated by an engineer when changing the sliding element. In this way, the detent means can be released from the receptacle quickly and without applying a great deal of force, for example by pulling and simultaneously actuating the operating element.

The detent means can be released from the receptacle associated therewith by pulling with a minimum force, pulling with a simultaneous rotational movement and/or by pulling with a simultaneous actuation of the operating element. The pulling with a minimum force is, first and foremost, a possibility with the rigid formation of the projections and/or cavities on detent means and the associated receptacle, but can also be applied with all the other embodiments. The minimum force is the amount of force which is necessary to pull the detent means with its projections past the corresponding projections of the receptacle and/or to pull it out of the corresponding cavities and is dependent on the form and the material of the formed projections of the detent means or respectively of the receptacle. The pulling together with the simultaneous rotational movement is particularly advantageous if the projections of the detent means and/or the projections of the receptacle are interrupted in sections. An additional securing element can preferably also be provided, which excludes the permissible occurrence of the minimum force being exceeded, the twisting or the actuation of the operating element.

In yet another embodiment, the current collector can have an apparatus for receiving and aligning the carrier, in which a recess is formed at each fastening point between the current collector and the sliding element, through which recess the detent means can be inserted through the apparatus into the receptacle associated therewith. In this embodiment, an apparatus such as, for example, a trough-shaped carrier structure is arranged on the current collector, which wholly or partially receives the carrier of the sliding element and, simultaneously, the carrier and, thus, aligns the entire sliding element in its position relative to the current collector. Recesses are provided in the apparatus for receiving and aligning the carrier in the region of the fastening points, so that the detent means can be introduced through said recesses into the respective receptacles. Thanks to the apparatus for receiving and aligning the carrier, the exact installation of the sliding element is simplified and accelerated since, thanks to the apparatus for receiving and aligning the carrier, the position of the sliding element is precisely predefined. The apparatus for receiving and aligning the carrier can be formed in one piece over the entire length of the carrier or can be formed in multiple parts.

In the device according to the invention, the carrier can be connected in an electrically conducting manner, in particular bonded, to the at least one carbon contact piece.

The object is further achieved by a current collector which comprises a device according to the invention for fastening a sliding element to a current collector.

A further aspect of the invention is an electrically driven vehicle, in particular an electrically driven rail vehicle, which comprises the current collector according to the invention having the device according to the invention for fastening a sliding element to a current collector.

The invention is explained in greater detail below with reference to drawings, wherein.

Figure 1A:
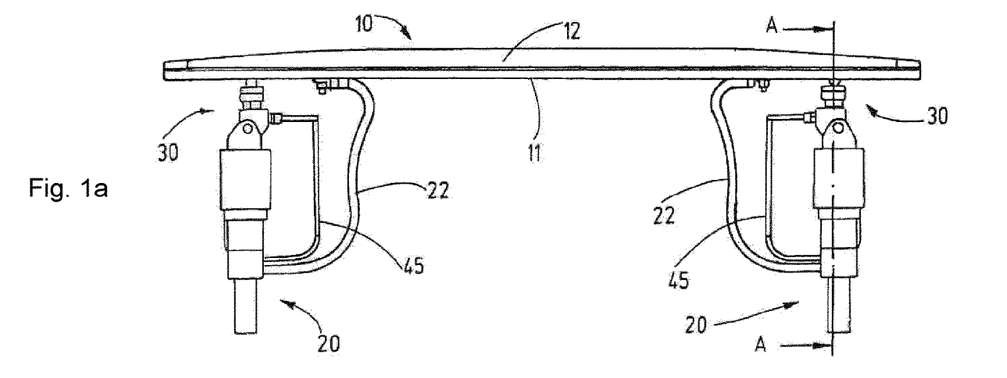
FIGS. 1a-c show a side view, a sectional view and a perspective view, respectively, of a sliding element having a device according to the invention for fastening to a current collector in a first embodiment.
Figure 1B:
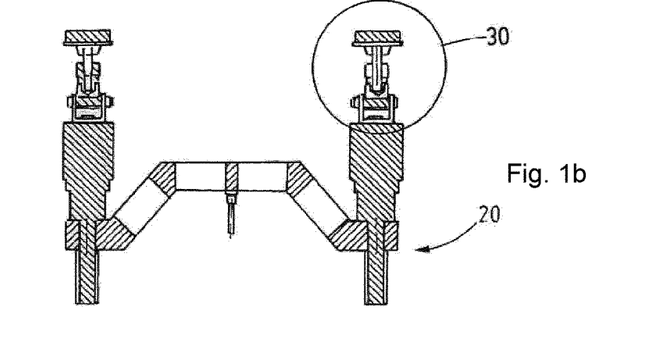
Figure 1C:
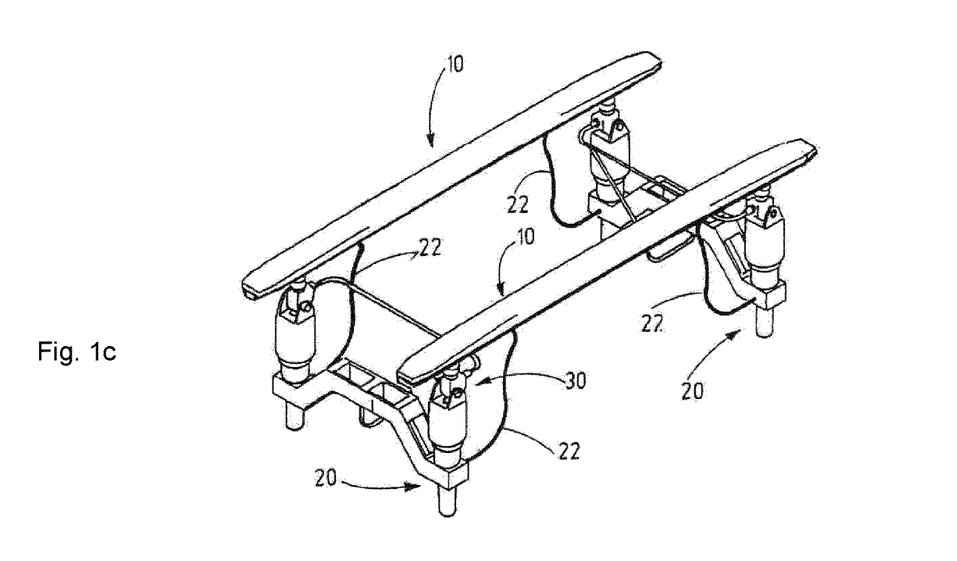

FIG. 1a shows a side view of a current collector 20 having a sliding element 10 and the device according to the invention for fastening the sliding element to an apparatus for receiving and aligning a carrier (rocker) to the current collector. The sliding element 10 has a carrier 11 and a carbon contact piece 12, wherein the carbon contact piece is fastened with an electrically conducting adhesive to the carrier 11. The sliding element 10 is fastened at two fastening points 30 to the current collector 20. A compressed air feed pipe 45 is guided to the fastening points 30 via the current collector. In FIG. 1a, a section A-A is identified, which is depicted in FIG. 1b. A perspective view of the current collector 20 having two sliding elements 10 from FIGS. 1a and 1b is depicted in FIG. 1c. Each sliding element 10 is connected at two fastening points 30, in each case, to the current collector 20.

Electrical connections 22 for contacting the sliding element 10 are further depicted in FIG. 1.

It is assumed below that the sliding element 10 is fastened to a receptacle of the rocker, even if a fastening to the current collector is referred to.

Figure 2A:
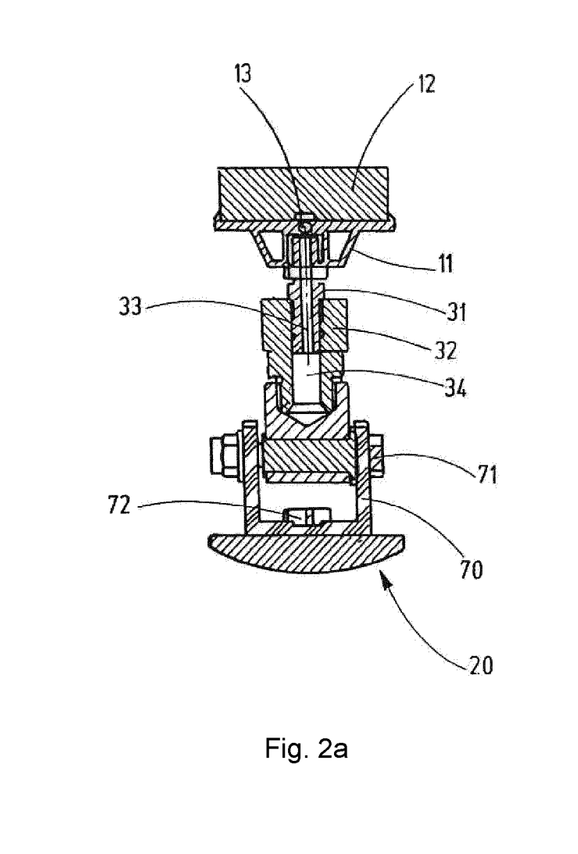
FIGS. 2a and 2b show two sectional views of the device according to the invention for fastening to a current collector in a first embodiment.
Figure 2B:
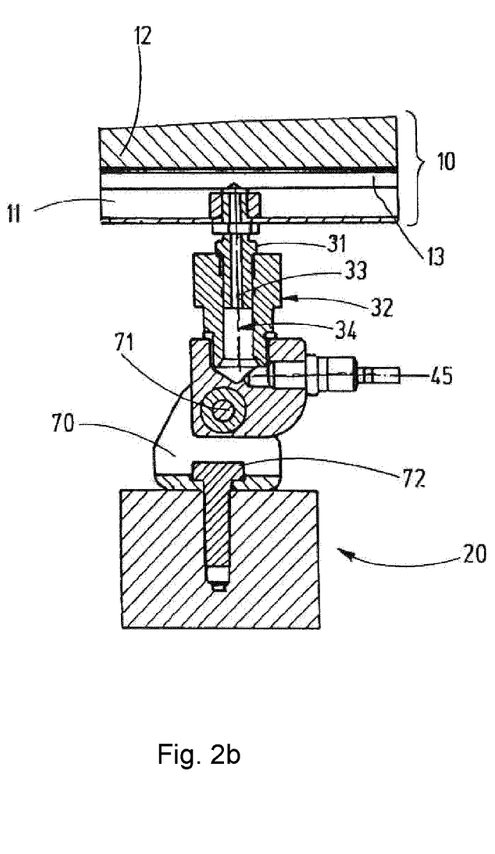

FIGS. 2a and 2b show two sectional views of the device according to the invention for fastening a sliding element 10 to a current collector 20 from FIGS. 1a-c in the region of a fastening point 30. In the carrier 11, a compressed air duct 13 for compressed air monitoring or respectively compressed air detection of the carbon contact piece 12 is formed. At the fastening point 30 a detent means 31 is formed on the sliding element 10, which detent means has a through hole for compressed air 33 in the interior. The detent means 31 is inserted and locked in a receptacle 32. The receptacle 32 has a through hole for compressed air 34. The fact that the detent means 31 and receptacle 32 engage in one another means that the through holes 33 and 34 form a continuous compressed air through hole through the fastening point 30. The compressed air is guided through a compressed air feed pipe 45 into the through hole 34 of the receptacle 32, through the through hole 34 of the receptacle 32 into the through hole 33 of the detent means 31 and from there directly into the compressed air duct 13 of the carrier 11. Thus, no separate connection of the compressed air supply is required since the pneumatic connection is established simultaneously during the inserting and locking of the detent means 31 in the receptacle 32.

In the embodiment depicted in FIGS. 2a and 2b, the receptacle 32 is fixed by means of a screw connection 71 in an adapter 70 which is, in turn, fastened by a further screw connection 72 to the current collector 20. This allows a rapid installation and change of the device for fastening the sliding element 10 to the current collector 20.

Figure 3A:
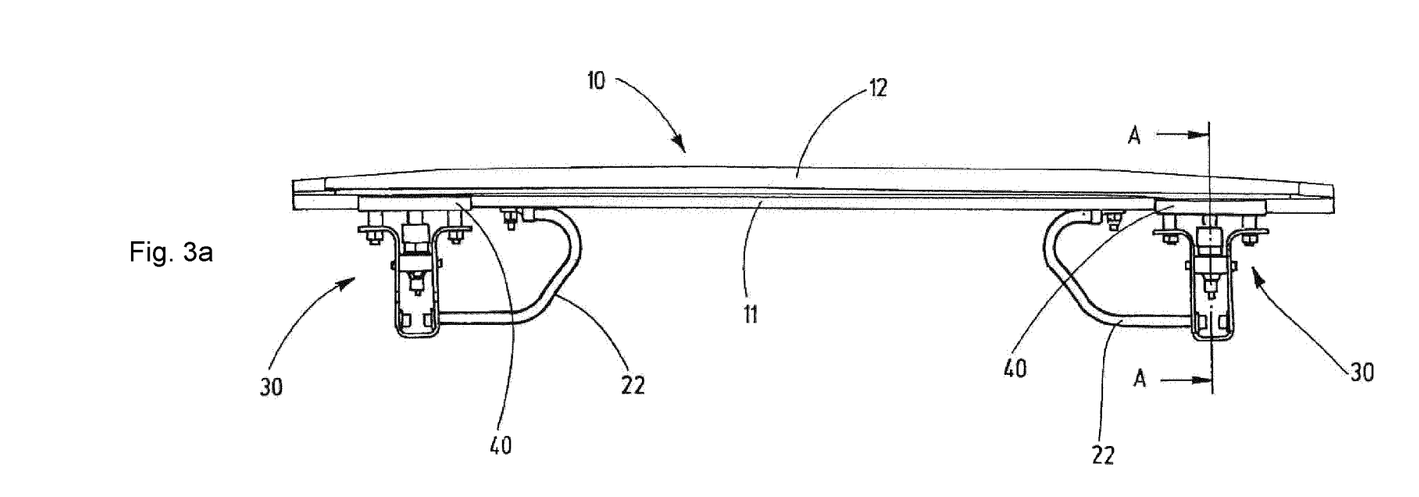
FIGS. 3a-c show a side view, a sectional view and a perspective view respectively, of a sliding element having the device according to the invention for fastening to a current collector in a second embodiment.
Figure 3B:
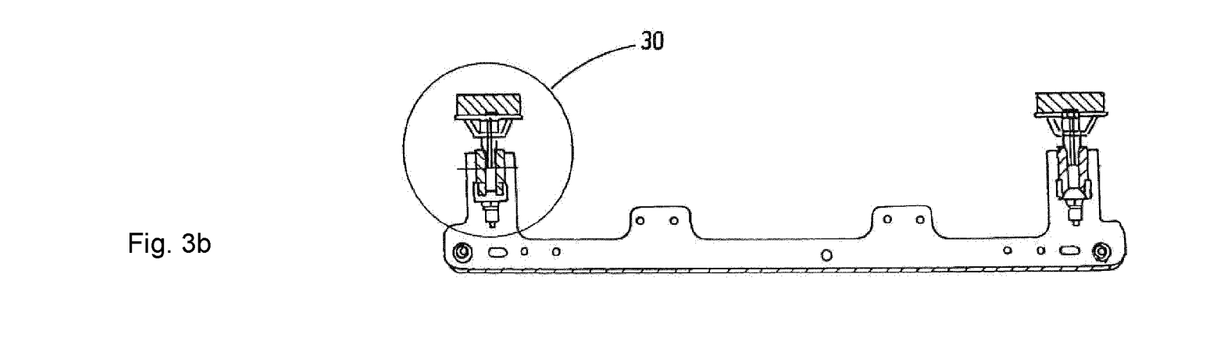
Figure 3C:
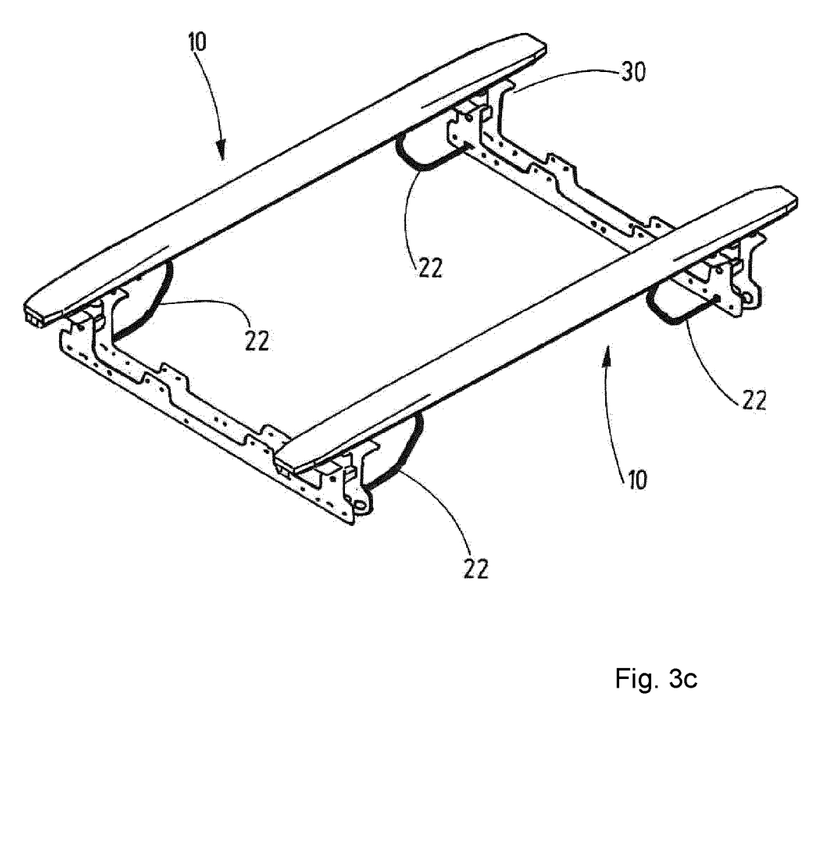

FIG. 3a shows a side view, FIG. 3b shows a sectional view and FIG. 3c shows a perspective view of a sliding element 10 having the device according to the invention for fastening to a current collector 20 in a second embodiment. As in FIGS. 1a and 1b, the sliding element 10 is formed with a carrier 11 and a carbon contact piece 12, which is fastened with an electrically conductive adhesive to the carrier 11. The sliding element 10 is initially introduced at two fastening points 30, in each case, into an apparatus 40 for receiving and aligning the carrier 11 and is connected through this to the current collector 20. The section A-A identified in FIG. 3a is depicted in FIG. 3b.

Figures 4A, 4B:
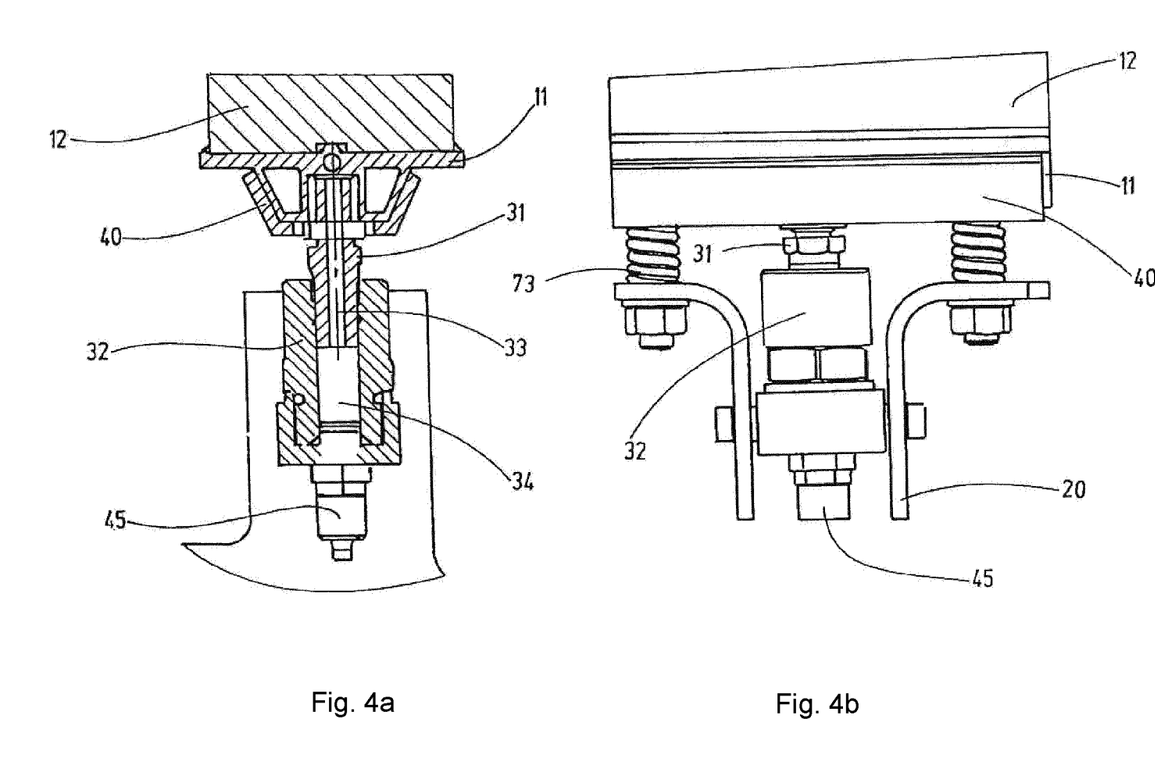
FIGS. 4a and 4b show two sectional views of the device according to the invention for fastening to a current collector in a second embodiment.

FIGS. 4a and 4b how two sectional views of the fastening point from FIGS. 3a-c. The apparatus 40 for receiving and aligning the carrier 11 is formed as a trough-shaped carrier structure which corresponds to the form of the carrier 11. The trough-shaped structure is connected by means of a screw connection 73 to the current collector 20. If the sliding element 10 having the carrier 11 is to be fastened to the current collector 20, it is placed at both fastening points 30, in each case, in the trough-shaped structure 110, and in this manner simultaneously aligned. At each fastening point 30, the detent means 31 is guided through a recess in the trough-shaped structure and into the receptacle 32 where it locks. In this second embodiment as well, a compressed air feed pipe 45 is provided, which guides compressed air from the current collector 20 through the through holes 33 and 34 which are in engagement with one another into the compressed air duct 13 of the carrier 11.

Figure 5A:
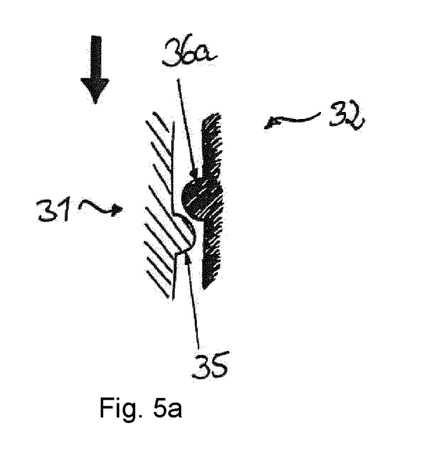
FIGS. 5a-c show sectional views of the formation of projections and cavities in the detent means and receptacle.
Figure 5B:
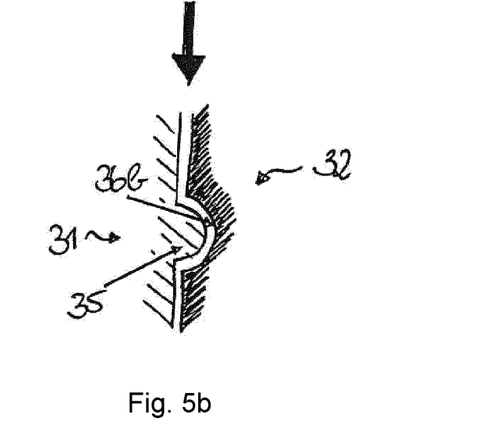
Figure 5C:
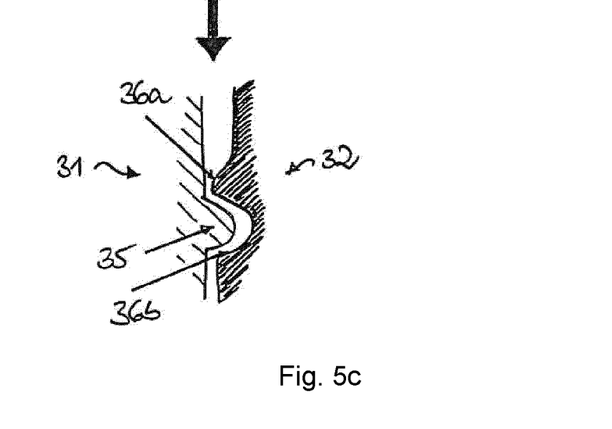

FIGS. 5a-c, the formation of outwardly directed curved projections 35 of the detent means 31 and corresponding projections 36a or respectively cavities 36b of the receptacle 32 are depicted, by way of example, in three sectional views.

FIG. 5a shows an embodiment, in which projections 36a corresponding to the projections 35 of the detent means 31 are formed in the receptacle and, following the insertion of the detent means 31 into the receptacle 32, are locked in the direction of the depicted arrow behind the projections 36a. FIG. 5b shows the situation if cavities 36b corresponding to the projections 35 of the detent means 31 are formed in the receptacle 32. FIG. 5c shows a combination form from FIGS. 5a and 5b. In all the depicted variants, the projections can be formed along the entire circumference of the detent means 31 or respectively the interior of the receptacle 32 or can be formed with interruptions.

Figure 6A:
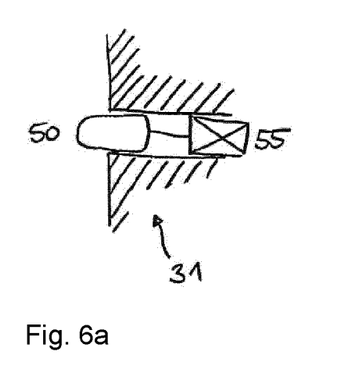
FIGS. 6a and 6b show schematic sectional views of the arrangement of movably supported elements and of the biasing mechanism.
Figure 6B:
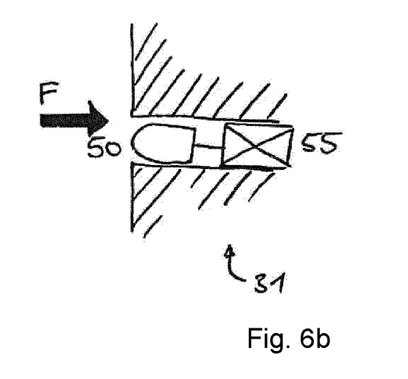

FIGS. 6a and 6b schematically show the formation of a projection 35 of the detent means 31 as a movably supported element 50 which is connected to a biasing mechanism 55. The rest position of the movably supported element 50 is depicted in FIG. 6a. The movably supported element 50 is pressed outwards by the biasing mechanism 55 and at least partially arranged projecting from the detent means 31 so that it forms an outwardly curved projection 35. FIG. 6b shows the movably supported element 50 pressed by an action of force, depicted by an arrow identified with F, into the interior of the detent means. This position of the movably supported element 50 is taken up when the detent means 31 is inserted into the receptacle 32. As soon as the movably supported element 50 is guided past a projection 36a of the receptacle 32 or arrives in the region of a cavity 36b in the receptacle 32, the movably supported element 50 is pressed outwards again by the biasing mechanism 55 so that the movably supported element 50 locks behind the projection 36a or in the cavity 36b. In addition, the biasing mechanism 55 can have an operating element 60 (not depicted) which can be actuated by an engineer when installing or changing the sliding element, in order to move movably supported elements 50 into the interior of the detent means 31 and, in this manner, facilitate the installation and release of the sliding element 10 from the current collector 20.

REFERENCE NUMERALS

10 Sliding element
11 Carrier
12 Carbon contact piece
13 Compressed air duct
20 Current collector
22 Electrical connection
30 Fastening point
31 Detent means
32 Receptacle for detent means 31
33, 34 Through hole for compressed air
35 Projection of the detent means 31
36a Corresponding projection in the receptacle 32
36b Corresponding cavity in the receptacle 32
40 Apparatus for receiving and aligning the carrier 11
45 Compressed air feed pipe
50 Movably supported element
55 Biasing mechanism
60 Operating element
70 Adapter for fastening to the current collector 20
71, 72, 73 Screw connection

The invention claimed is:

1. A device for fastening a sliding element having a carrier, a carbon contact piece on the carrier, and an air duct between the carrier and the carbon contact piece to a current collector to draw electrical energy from a stationary overhead contact line to an electrically driven vehicle having a current collector, the device comprising:
a detent assembly at a fastening point that fastens the sliding element to the current collector, the detent assembly arranged on a side of the sliding element, the detent assembly having a first through hole extending through the detent assembly and configured to be coupled with the air duct between the carrier and the carbon contact piece; and
a receptacle on a side of the current collector, the receptacle for receiving the detent assembly, the detent assembly and the receptacle are configured to be releasably brought into engagement with each other by inserting and locking the detent assembly in the receptacle, the receptacle having a second through hole extending through the receptacle and configured to be coupled with a compressed air feed pipe, the detent assembly configured to be received into the receptacle with the first through hole and the second through hole forming a continuous compressed air through hole extending from the compressed air feed pipe to the air duct.

2. The device according to claim 1, further comprising:
the sliding element with the carrier, the carrier having the air duct for a compressed air indication or respectively a damage or wear indication of the carbon contact piece.

3. The device according to claim 2, wherein the first through hole of the detent assembly and the second through hole of the receptacle form the continuous through hole for a compressed air transfer from the current collector into the air duct in the carrier while the detent assembly and the receptacle are releasably brought into engagement with each other.

4. The device according to claim 1, wherein the detent assembly has outwardly directed projections which, on insertion of the detent assembly into the receptacle, lock behind one or more of corresponding projections or corresponding cavities in the receptacle.

5. The device according to claim 4, wherein one or more of the outwardly directed projections or the cavities in the receptacle are interrupted in sections.

6. The device according to claim 4, wherein the receptacle includes the projections that are formed as movably supported elements and are connected to a biasing mechanism so that, on insertion of the detent assembly into the receptacle, the movably supported elements are pressed into an interior of the detent assembly and, after one or more of passing through the projections or reaching the cavities, the movably supported elements are pressed out of the interior of the detent assembly by the biasing mechanism.

7. The device according to claim 6, wherein the biasing mechanism has an operating element for manual actuation to move the movably supported elements into the interior of the detent assembly.

8. The device according to claim 7, wherein the detent assembly can be released from the receptacle by one or more of pulling with a minimum force, pulling with a simultaneous rotational movement, or by pulling with a simultaneous actuation of the operating element.

9. The device according to claim 1, wherein the current collector has an apparatus for receiving and aligning the carrier, in which a recess is formed at the fastening point between the current collector and the sliding element, through which recess the detent assembly can be inserted through the apparatus into the receptacle.

10. A current collector, comprising the device according to claim 1.

11. An electrically driven vehicle comprising the current collector according to claim 10.

12. A device, comprising:
a detent assembly configured to be coupled with a sliding element configured to engage a contact line for delivery of electrical energy from the contact line to a vehicle having a current collector, the detent assembly having a first through hole extending through the detent assembly and coupled with an air duct extending through the sliding element; and
a receptacle configured to be coupled with the current collector of the vehicle, the receptacle having a second through hole extending through the receptacle and configured to be coupled with a feed pipe to receive air from the feed pipe, the first through hole and the second through hole configured to be aligned with each other to form a continuous through hole extending from the feed pipe to the air duct through the receptacle and the detent assembly.

13. The device of claim 12, wherein the first through hole and the second through hole are configured to form the continuous through hole for supplying the air from the feed pipe to the air duct for monitoring wear of the sliding element.

14. The device of claim 12, wherein the detent assembly has outwardly extending projections and the receptacle has inwardly extending projections that lock the detent assembly in the receptacle.

15. The device of claim 12, wherein the detent assembly has outwardly extending projections and the receptacle has inwardly extending cavities that receive the outwardly extending projections.

16. The device of claim 12, wherein the detent assembly has outwardly extending projections and the receptacle has inwardly extending cavities with inwardly extending projections with the outwardly extending projections of the detent assembly received in the inwardly extending cavities between the inwardly extending projections of the receptacle.

\* \* \* \* \*